M. L. SUND.
SPUR FOR DRIVING REINS.
APPLICATION FILED AUG. 5, 1910.

988,152.

Patented Mar. 28, 1911.

Witnesses
Harry King
James B. Koehl

Inventor
Martin L. Sund

By Victor J. Evans
Attorney

UNITED STATES PATENT OFFICE.

MARTIN L. SUND, OF WARLAND, MONTANA.

SPUR FOR DRIVING-REINS.

988,152.  Specification of Letters Patent.  Patented Mar. 28, 1911.

Application filed August 5, 1910. Serial No. 575,650.

*To all whom it may concern:*

Be it known that I, MARTIN L. SUND, a citizen of the United States of America, residing at Warland, in the county of Lincoln and State of Montana, have invented new and useful Improvements in Spurs for Driving-Reins, of which the following is a specification.

This invention relates to spurs for driving reins, and the object of the invention is to provide a device of this character obviating the use of a whip, the device being designed for attachment to the rein so that the driver who has full control of the reins can operate them so as to cause the spur to be moved suddently into contact with the rear part of the animal so as to inflict sufficient pain to arouse him.

Figure 1:
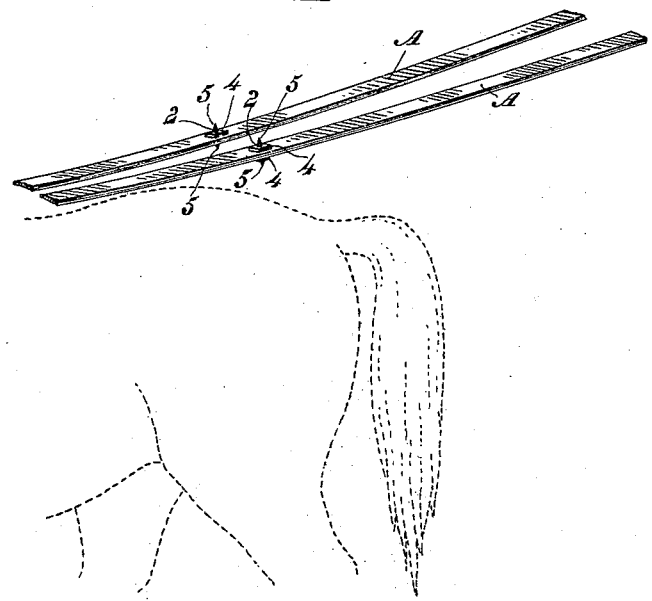
Figure 2:
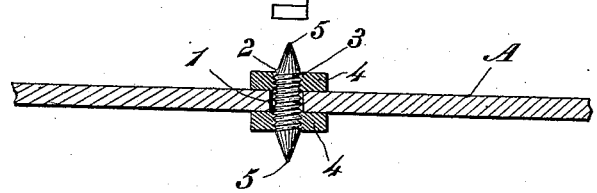

In the drawing, forming a portion of this specification and in which like characters of reference indicate similar parts in the several views:—Figure 1 is a detail perspective view showing the application of the invention to the rein line. Fig. 2 is a detail section through the line and through the spur.

The rein line A is formed to provide an aperture 1 through which extends the spur 2. This spur is provided with an intermediate threaded shank 3 which extends beyond the opposite sides of the rein so as to receive the clamping nuts 4. As clearly illustrated in Fig. 2, the nuts are adjusted to bear against the opposite sides of the rein so as to hold the spur operatively positioned thereon. The extremities of the spur are formed to provide relatively sharp pointed ends 5.

The device is intended for use particularly on the harness of draft animals so that the operator who has control of the rein lines can operate them to inflict sufficient pain on the animal to awaken or arouse him, as is obvious.

The device herein described and illustrated is extremely simple in construction and inexpensive to manufacture and is extremely desirable for the reason that it can be applied to rein lines of the ordinary construction.

I claim:

The combination with a driving rein having an opening therein, of a cylindrical member of less diameter than the opening extending through the opening and having threaded portions extending beyond the opposite sides of the line, the said cylindrical member having its ends formed to provide relatively sharp pointed portions, and a nut at each side of the line engaged with the threaded portion of the said cylindrical member and bearing against the line to hold the said cylindrical member against rotation on the line.

In testimony whereof I affix my signature in presence of two witnesses.

MARTIN L. SUND.

Witnesses:
 HENRY GASS,
 L. E. MONTGOMERY.

Copies of this patent may be obtained for five cents each, by addressing the "Commissioner of Patents, Washington, D. C."